United States Patent
Hu et al.

(10) Patent No.: US 12,337,851 B2
(45) Date of Patent: Jun. 24, 2025

(54) LOADING CALCULATION MODULE, VEHICLE ANTI-RUNAWAY SYSTEM, VEHICLE AND METHOD USING THE SAME

(71) Applicant: INDUSTRIAL TECHNOLOGY RESEARCH INSTITUTE, Hsinchu (TW)

(72) Inventors: Chia-Jui Hu, New Taipei (TW); Tse-Lin Lee, New Taipei (TW); Ming-Xuan Wu, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 287 days.

(21) Appl. No.: 18/089,072

(22) Filed: Dec. 27, 2022

(65) Prior Publication Data
US 2024/0208512 A1   Jun. 27, 2024

(51) Int. Cl.
*B60W 40/13* (2012.01)
*B41J 2/175* (2006.01)

(52) U.S. Cl.
CPC ..... *B60W 40/13* (2013.01); *B60W 2040/1315* (2013.01); *B60W 2040/1323* (2013.01); *B60W 2520/125* (2013.01)

(58) Field of Classification Search
CPC .... B60W 40/13; B60W 50/038; B60W 30/04; G05B 13/048; E01H 5/04; B06G 17/0162; B60S 9/14; B41J 2/175
See application file for complete search history.

(56) References Cited

U.S. PATENT DOCUMENTS

| 6,005,492 A | 12/1999 | Tamura et al. |
| 8,437,938 B2 | 5/2013 | Schwarz et al. |
| 2007/0022636 A1* | 2/2007 | Wakitani ............ E01H 5/04 |

(Continued)

FOREIGN PATENT DOCUMENTS

| CN | 2403641 Y * 11/2000 ............ B60S 9/14 |
| CN | 101460350 B    3/2013 |

(Continued)

OTHER PUBLICATIONS

Australian Office Action for Australian Application No. 2023202486, dated Jul. 10, 2024.

(Continued)

*Primary Examiner* — Yuri Kan
(74) *Attorney, Agent, or Firm* — Birch, Stewart, Kolasch & Birch, LLP

(57) ABSTRACT

A loading calculation module includes a storage unit, an inertial sensing unit and a calculation unit. The first storage unit is configured to store a relationship between an engine performance and a load, a sprung mass, a centroid distance between a sprung centroid, a rotation center and a moment of inertia. The inertial sensing unit is configured to detect a tilt angle, a tilt angular velocity, a tilt angular acceleration and a lateral acceleration. The calculation unit is configured to obtain a load corresponding to the engine performance according to the relationship between the engine performance and the load; and obtain a load position according to the moment of inertia, the tilt angle, the tilt angular velocity, the tilt angular acceleration, the lateral acceleration, the load and the centroid distance.

13 Claims, 6 Drawing Sheets

(56) References Cited

U.S. PATENT DOCUMENTS

| | | | | |
|---|---|---|---|---|
| 2007/0129867 A1* | 6/2007 | Huang | ............... | B60W 30/04 |
| 2010/0168961 A1 | 7/2010 | Messih et al. | | |
| 2012/0001582 A1* | 1/2012 | Park | ............... | G05B 13/048 |
| 2020/0086877 A1* | 3/2020 | Zhang | ............... | B60W 50/038 |

FOREIGN PATENT DOCUMENTS

| | | | | | |
|---|---|---|---|---|---|
| CN | 104401323 | A | | 3/2015 | |
| CN | 109399472 | A | | 3/2019 | |
| CN | 108657175 | B | | 8/2020 | |
| CN | 112622876 | A | | 4/2021 | |
| CN | 113830075 | A | | 12/2021 | |
| CN | 114604234 | A | | 6/2022 | |
| CN | 115476864 | A | | 12/2022 | |
| JP | H0447257 | B2 | * | 8/1992 | ............... B41J 2/175 |
| JP | 2005225302 | A | * | 8/2005 | ......... B06G 17/0162 |
| TW | M361439 | U1 | | 7/2009 | |
| TW | I500542 | B | | 9/2015 | |
| TW | I894947 | B | | 6/2020 | |
| WO | WO 2021/217957 | A1 | | 11/2021 | |

OTHER PUBLICATIONS

Ervin, "Two Active Systems for Enhancing Dynamic Stability in Heavy Truck Operations", Jul. 1998, 218 pages total.

Hosamel-Deen et al., Evaluation of the Dynamic Performance of Articulated Vehicles (Case Study), International Conference on Aerospace Sciences & Aviation Technology, vol. 8, No. ASAT Conference, May 4-6, 1999, pp. 419-439.

Phanomchoeng et al., "New Rollover Index for Detection of Tripped and Un-Tripped Rollovers", IEEE Transactions on Industrial Electronics 60.10, 2012, pp. 7440-7445.

Yang, "On the Estimation of Center of Gravity Height of Arbitrarily Loaded Articulated Freight Vehicle" Concordia University, Mar. 7, 2005, 203 pages total.

Taiwanese Office Action and Search Report for Taiwanese Application No. 111150145, dated Dec. 25, 2023.

Jalali et al.,"Model Predictive Control of Vehicle Roll-Over with Experimental Verification" Control Engineering Practice, vol. 77, 2018, pp. 95-108.

Lee et al.,"Rollover Prevention with Predictive Control of Differential Braking and Rear Wheel Steering" IEEE Conference on Robotics, Automation and Mechatronics, 2013, pp. 144-149.

Solmaz et al.,"A Methodology for the Design of Robust Rollover Prevention Controllers for Automotive Vehicles: Part 2-Active Steering" Proceedings of the 2007 American Control Conference, Marriott Marquis Hotel at Times Square, New York City, USA, Jul. 11-13, 2007, pp. 1606-1611.

Viehweger et al.,"Vehicle State and Tyre Force Estimation: Demonstrations and Guidelines" Department of Mechanical Engineering, Dec. 23, 2019, 27 pages total.

Wu et al."Research on Vehicle Rollover and Control" IEEE, 2010, pp. 510-514.

Zhu et al., "A Real-Time Rollover Warning System for Heavy Duty Vehicle" International Conference on Challenges in Environmental Science and Computer Engineering, IEEE, 2010, pp. 324-327.

* cited by examiner

LOADING CALCULATION MODULE, VEHICLE ANTI-RUNAWAY SYSTEM, VEHICLE AND METHOD USING THE SAME

TECHNICAL FIELD

The disclosure relates in general to a loading calculation module, a vehicle anti-runaway system, a vehicle using the same, a load calculation method using the same and a vehicle anti-runaway method using the same.

BACKGROUND

Whether the vehicle is a bus or a truck of various types, its handling stability will be affected by high loads. In general, the driver makes a judgment based on the rule of thumb. Consequently, if driver is inexperienced, mentally ill or little careless, the vehicle will easily lose control, and accordingly it cause harm to driver himself and surrounding vehicles. Therefore, how to improve the aforementioned conventional problem is one of the goals of those skilled in the art.

SUMMARY

According to an embodiment of the present disclosure, a load calculation module is provided. The load calculation module includes a first storage unit, an inertial sensing unit and a calculation unit. The first storage unit is configured to store a relationship between an engine performance and a load, a sprung mass and a centroid distance between a sprung centroid and a rotation center. The inertial sensing unit is configured to detect a tilt angle, a tilt angular velocity, a tilt angular acceleration and a lateral acceleration. The calculation unit is configured to obtain a load corresponding to the engine performance according to the relationship between the engine performance and the load; and obtain a load position according to a moment of inertia, the tilt angle, the tilt angular velocity, the tilt angular acceleration, the lateral acceleration, the load and the centroid distance.

According to another embodiment of the present disclosure, a vehicle anti-runaway system is provided. The vehicle anti-runaway system includes a load calculation module, a runaway prevention module. The load calculation module includes a first storage unit, an inertial sensing unit and a calculation unit. The first storage unit is configured to store a relationship between an engine performance and a load, a sprung mass, a centroid distance between a sprung centroid and a rotation center. The inertial sensing unit is configured to detect a tilt angle, a tilt angular velocity, a tilt angular acceleration and a lateral acceleration. The calculation unit is configured to obtain a load corresponding to the engine performance according to the relationship between the engine performance and the load; and obtain a load position according to a moment of inertia, the tilt angle, the tilt angular velocity, the tilt angular acceleration, the lateral acceleration, the load and the centroid distance. The runaway prevention module includes a second storage unit and a maximum anti-overturn lateral acceleration calculation unit. The second storage unit is configured to store the centroid distance, the sprung mass, a rotation center distance and a wheelbase. The maximum anti-overturn lateral acceleration calculation unit is configured to obtain a maximum anti-overturning lateral acceleration according to the load position, the load, the centroid distance, the sprung mass, the rotation center distance and the wheelbase.

According to another embodiment of the present disclosure, a vehicle is provided. The vehicle includes an unsprung system, a sprung system and a vehicle anti-runaway system. The unsprung system has a rotation center. The sprung system is disposed on the unsprung system and has a sprung centroid. The vehicle anti-runaway system is configured to obtain the maximum anti-overturning lateral acceleration of the vehicle. The vehicle anti-runaway system includes a load calculation module, a runaway prevention module and a maximum anti-overturn lateral acceleration calculation unit. The load calculation module includes a first storage unit, an inertial sensing unit and a calculation unit. The first storage unit is configured to store a relationship between an engine performance and a load, a sprung mass, a centroid distance between a sprung centroid, a rotation center and a moment of inertia. The inertial sensing unit is configured to detect a tilt angle, a tilt angular velocity, a tilt angular acceleration and a lateral acceleration. The calculation unit is configured to obtain a load corresponding to the engine performance according to the relationship between the engine performance and the load; and obtain a load position according to the moment of inertia, the tilt angle, the tilt angular velocity, the tilt angular acceleration, the lateral acceleration, the load and the centroid distance. The runaway prevention module includes a second storage unit and a maximum anti-overturn lateral acceleration calculation unit. The second storage unit is configured to store the centroid distance, the sprung mass, a rotation center distance and a wheelbase. The maximum anti-overturn lateral acceleration calculation unit is configured to obtain a maximum anti-overturning lateral acceleration according to the load position, the load, the centroid distance, the sprung mass, the rotation center distance and the wheelbase.

According to another embodiment of the present disclosure, a load calculation method is provided. The load calculation method includes the following steps: detecting a tilt angle, a tilt angular velocity, a tilt angular acceleration and a lateral acceleration by an inertial sensing unit; obtaining a load corresponding to an engine performance according to a relationship between an engine performance and a load by a calculation unit; and obtaining a load position according to a moment of inertia, the tilt angle, the tilt angular velocity, the tilt angular acceleration, the lateral acceleration, the load and a centroid distance by the calculation unit.

According to another embodiment of the present disclosure, a vehicle anti-runaway method is provided. The vehicle anti-runaway method includes the following steps: using the load calculation method as described above to obtain the load and the load position; and obtaining a maximum anti-overturning lateral acceleration according to the load position, the load, the centroid distance, the sprung mass, a rotation center distance and a wheelbase.

The above and other aspects of the disclosure will become better understood with regard to the following detailed description of the preferred but non-limiting embodiment(s). The following description is made with reference to the accompanying drawings.

DETAILED DESCRIPTION

Figure 1:
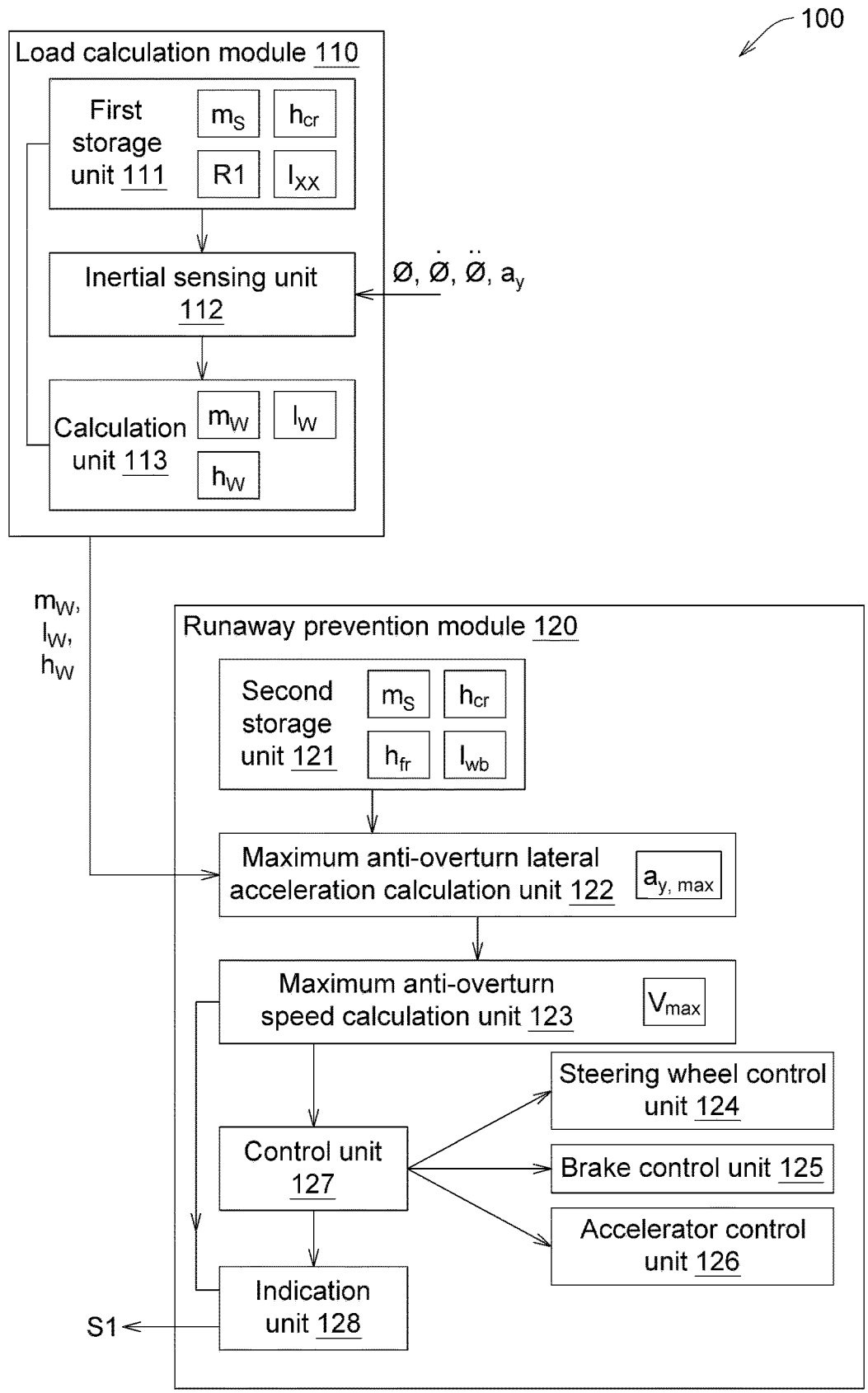
FIG. 1 shows a functional block diagram of a vehicle anti-runaway system according to an embodiment of the present disclosure.
Figure 2:
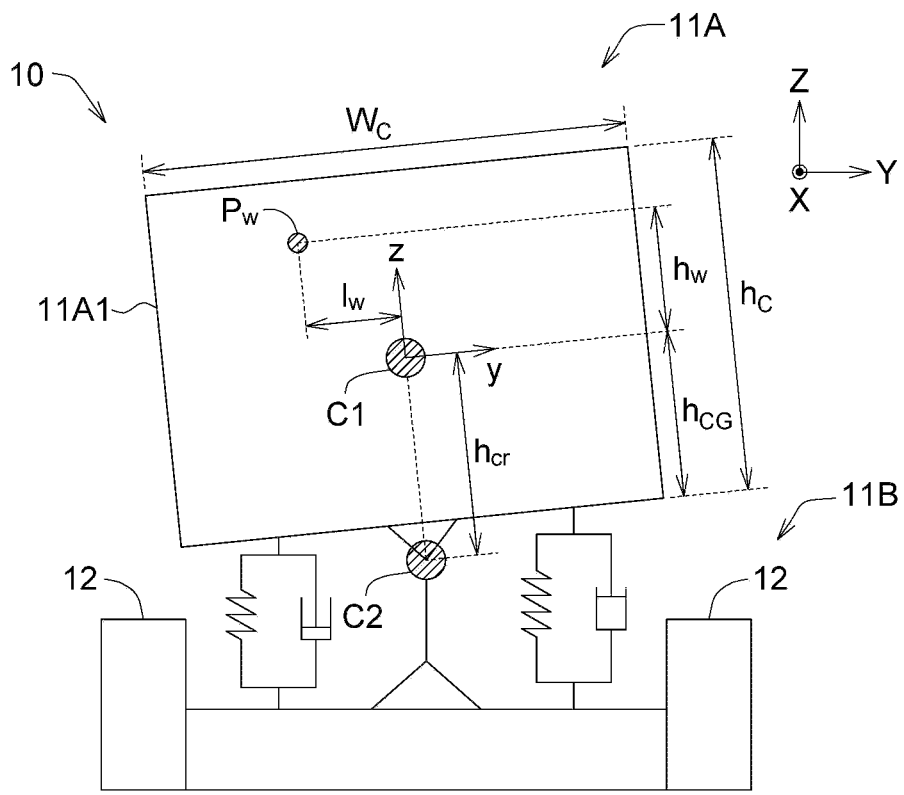
FIG. 2 shows an equivalent system diagram of mass-damping-spring (MCK) of the vehicle of the vehicle anti-runaway system 100.
Figure 3:
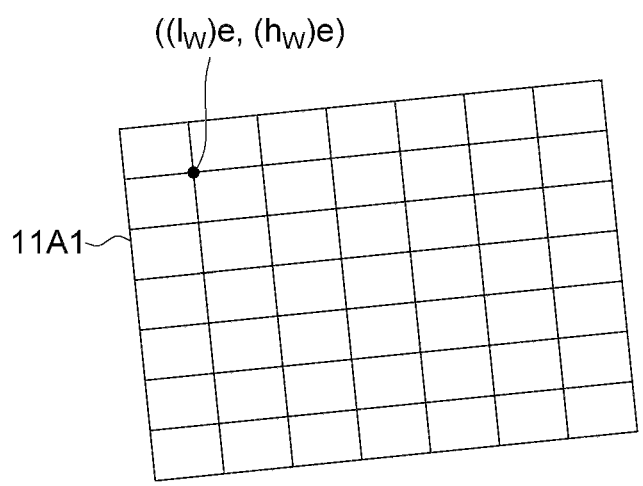
FIG. 3 shows a schematic diagram of a plurality of trial-and-error coordinate groups of a sprung system of FIG. 1.
Figure 4:
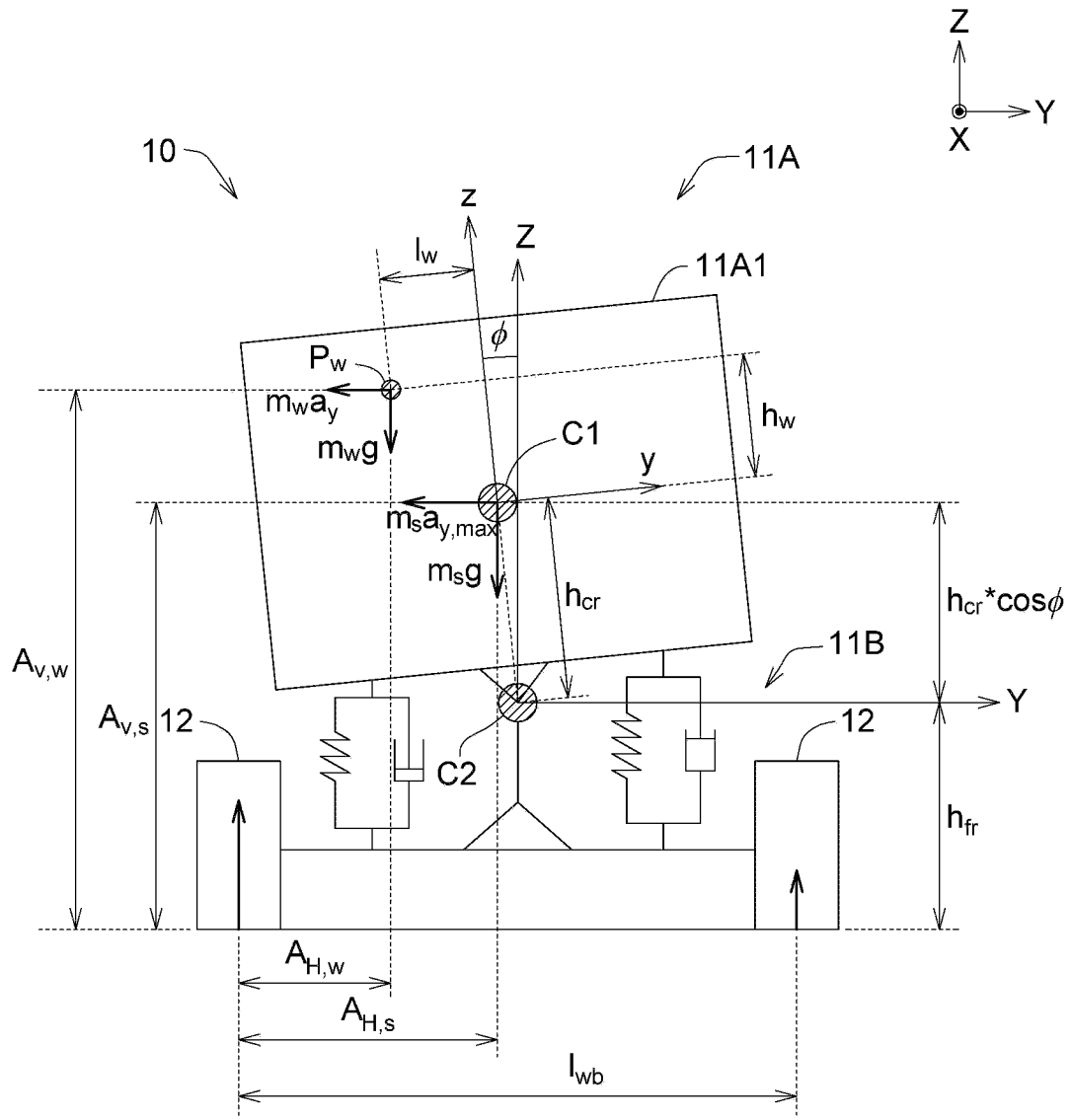
FIG. 4 shows a schematic diagram of the MCK equivalent system when the vehicle of FIG. 2 being turning.

Referring to FIGS. 1 to 4, FIG. 1 shows a functional block diagram of a vehicle anti-runaway system 100 according to an embodiment of the present disclosure, FIG. 2 shows an equivalent system diagram of mass-damping-spring (MCK) of the vehicle 10 of the vehicle anti-runaway system 100, FIG. 3 shows a schematic diagram of a plurality of trial-and-error coordinate groups $((l_w)_e, (h_w)_e)$ of a sprung system 11A of FIG. 1, and FIG. 4 shows a schematic diagram of the MCK equivalent system when the vehicle 10 of FIG. 2 being turning.

As shown in FIG. 1, the vehicle runaway prevention system 100 includes a load calculation module 110 and a runaway prevention module 120. The vehicle anti-runaway system 100 could be applied to the vehicle 10, such as a van, a truck, etc. The vehicle 10 includes a sprung system 11A, an unsprung system 11B and a vehicle anti-runaway system 100. The sprung system 11A includes, for example, a frame of the vehicle 10, a container 11A1, a power system, etc., and has a sprung centroid (center of mass) C1. The unsprung system 11B includes, for example, a suspension of the vehicle 10, a plurality of wheels 12 of the vehicle 10 or tracks (if any) of the vehicle 10 and other parts directly connected thereto. When the vehicle 10 turns, the sprung system 11A tilts. For example, the sprung system 11A turns about a rotation center C2. The rotation center C2 here may coincide with an unsprung centroid (unsprung mass) or deviate from the unsprung centroid.

The load calculation module 110 is configured to obtain a load $m_W$ and a load position $P_W$. The load $m_W$ is, for example, the mass (weight) of the cargo (not shown) carried by the vehicle 10. The load position $P_W$ is, for example, the centroid of the cargo carried by the vehicle. The runaway prevention module 120 could perform a vehicle runaway evaluation according to the load $m_W$ and the load position $P_W$. When an evaluation result is that the vehicle may, is about to or has lost control (for example, overturned), the runaway prevention module 120 could perform a corresponding anti-runaway control.

The following firstly introduces the load calculation module 110 and the process of obtaining the load $m_W$ and the load position $P_W$ using the load calculation module 110.

The load calculation module 110 includes a first storage unit 111, an inertial sensing unit 112 and a calculation unit 113. The first storage unit 111 is configured to store a relationship R1 between an engine performance and the load, a sprung mass $m_S$ and a centroid distance her between the sprung centroid C1 and the rotation center C2. The inertial sensing unit 112 is configured to detect a tilt angle ∅, a tilt angular velocity $\dot{\varnothing}$, a tilt angular acceleration $\ddot{\varnothing}$ and a lateral acceleration $a_y$. The calculation unit 113 is configured to obtain the load $m_W$ corresponding to the engine performance according to the relationship R1 between the engine performance and the load; and obtain the load position $P_W$ according to a moment of inertia $I_{XX}$, the tilt angle ∅, the tilt angular velocity $\dot{\varnothing}$, the tilt angular acceleration $\ddot{\varnothing}$, the lateral acceleration $a_y$, the load $m_W$ and the centroid distance $h_{cr}$. In an embodiment, "unit" herein could be "physical circuit".

The aforementioned inertial sensing unit 112 is, for example, a gyroscope, an acceleration sensor or a combination thereof. The sprung mass $m_S$ is, for example, a mass of the sprung system 11A in an empty state (no cargo).

The load position $P_W$ could be expressed as $(l_W, h_W)$ which could be referred to a coordinate system y-z, wherein an origin of the coordinate system y-z is, for example, established on the sprung centroid C1. $l_W$ is a first load distance between the load position $P_W$ and the sprung centroid C1 in a first axis y, and $h_W$ is a second load distance between the load position $P_W$ and the sprung centroid C1 in a second axis z.

In addition, the aforementioned moment of inertia $I_{XX}$ is, for example, the moment of inertia of the sprung system 11A. The relationship R1 is, for example, a relationship between engine performance and load. The relationship R1 records the load $m_W$ corresponding to different engine performances (for example, the performance of a throttle pedal depth and starting acceleration, etc.). The relationship R1 could be measured in advance through simulation or actual measurement, and stored in the first storage unit 111. The sprung mass $m_S$, the centroid distance $h_{cr}$ and the moment of inertia $I_{XX}$ could also be measured in advance and stored in the first storage unit 111.

In an embodiment, the calculation unit 113 could obtain the load position $P_W$ according to the following formulas (1) to (1D). In the formula, g is a gravitational acceleration, $K_R$ is an elastic coefficient of the equivalent system of the vehicle 10, and $C_R$ is a damping coefficient of the equivalent system of the vehicle 10. Coefficients A, B, C and D of formula (1) could be obtained according to formulas (1A) to (1D).

$$A((l_w)_e + (h_w)_e)^2 + B(l_w)_e + C(h_w)_e + D = RV1; \quad (1)$$

$$A = m_w\ddot{\phi}; \quad (1A)$$

$$B = m_w a_y \sin\phi - m_w g \cos\phi; \quad (1B)$$

$$C = -(m_w g \sin\phi + m_w a_y \cos\phi) \quad (1C)$$

$$D = I_{XX}\ddot{\phi} + C_R\dot{\phi} + K_R\phi - \quad (1D)$$
$$(m_s a_y h_{cr}\cos\phi + m_s g h_{cr}\sin\phi + m_w a_y h_{cr}\cos\phi + m_w g h_{br}\sin\phi)$$

One of the methods for obtaining the load distances $l_W$ and $h_W$ is described below, such as the trial-and-error method or the exhaustive method.

The calculation unit 113 is further configured to: obtain a plurality of result values RV1 of formula (1) by substituting a plurality of first trial-and-error values $(l_w)_e$ along the first axis y and a plurality of second trial-and-error values $(h_w)_e$ along the second axis z in formulas (1) to (1D); select the result value of the result values RV1 that is less than a preset value; and use the first trial-and-error values $(l_w)_e$ and the second trial-and-error values $(h_w)_e$ corresponding to the result value less than the preset value as the first load distance $l_W$ and the second load distance $h_W$ respectively to satisfy $A(l_w+h_w)^2+Bl_w+Ch_w+D\cong 0$. As shown in FIG. 3, the calculation unit 113 could divide the container 11A1 into a plurality of grids along the first axis y and the second axis z with a plurality of grid lines, and an intersection point of the grid lines has one trial-and-error coordinate groups $((l_w)_e, (h_w)_e)$. The foregoing preset value depends on the number of grids in FIG. 3, which is not limited in the embodiments of the present disclosure. In an embodiment, the aforementioned preset value may be inversely proportional to the number of grids. In other embodiments, the preset value may range between 0.01 centimeter (cm) to 10 cm, a greater value, or other values closer to 0.

At a first time point, if the number of the result values that are smaller than the preset value is plural, then at the second time point, the calculation unit 113 substitutes the trial-and-error coordinate groups $((l_w)_e, (h_w)_e)$ corresponding to the result values that are smaller than the preset value and the tilt angle $\emptyset$, the tilt angular velocity $\dot{\emptyset}$, the tilt angular acceleration $\ddot{\emptyset}$ and the lateral acceleration $a_y$ that are currently (or latest) detected into the above formulas (1) to (1D), accordingly obtain a plurality of result values RV1, and uses the first trial-and-error values $(l_w)_e$ and the second trial-and-error values $(h_w)_e$ corresponding to the result values that are smaller than the preset value as the first load distance $l_W$ and the second load distance $h_W$ respectively. If at the second time point, the number of the result value less than the preset value is still plural, then repeat the above process at the next time point until the number of result values less than the preset value is single, and the first trial-and-error values $(l_w)_e$ and the second trial-and-error values $(h_w)_e$ corresponding to the single result value are used as the first load distance $l_W$ and the second load distance $h_W$ respectively.

In addition, the inertial sensing unit 112 detects the tilt angle $\emptyset$, the tilt angular velocity $\dot{\emptyset}$, the tilt angular acceleration $\ddot{\emptyset}$ and the lateral acceleration $a_y$ at each time point. The tilt angle $\emptyset$, the tilt angular velocity $\dot{\emptyset}$, the tilt angular acceleration $\ddot{\emptyset}$ and the lateral acceleration $a_y$ detected by the inertial sensing unit 112 at each time point could be different due to the turning radius r of the vehicle and/or the vehicle velocity.

As shown in the following formulas (2A) to (2B), the numerical ranges of the aforementioned first trial-and-error values $(l_w)_e$ along the first axis y satisfy the following formula (2A), while the numerical ranges of the aforementioned second trial-and-error values $(h_w)_e$ along the second axis z satisfy the following formula (2B). In formula (2A), $W_C$ is a length of the sprung system 11A along the first axis y, and $h_C$ is a length of the sprung system 11A along the second axis z, wherein the length $W_C$ and the length $h_C$ are known values.

$$-w_c/2 \leq (l_w)_e \leq +w_c/2 \quad (2A)$$

$$-h_C/2 \leq (h_w)_e \leq +h_C/2 \quad (2B)$$

In addition, a set of the first trial-and-error values $(l_w)_e$ and the second trial-and-error values $(h_w)_e$ is a coordinate value $((l_w)_e, (h_w)_e)$ of a position point in the sprung system 11A, the coordinate value $((l_w)_e, (h_w)_e)$ of different position points are different. In addition, the more the number of sets of the trial-and-error coordinate values $((l_w)_e, (h_w)_e)$ of FIG. 3 is (the number of divided grids is more), the less the difference between the load position $P_W$ and the actual position of the centroid of the cargo carried by the vehicle 10 is. In an embodiment, the difference between the obtained load position $P_W$ and the actual position of the centroid of the cargo carried by the vehicle 10 that is within a few centimeters (for example, within 10 cm) is within a tolerable range.

The runaway prevention module 120 and the runaway prevention method using the same are introduced below.

As shown in FIG. 1, the runaway prevention module 120 includes a second storage unit 121, a maximum anti-overturn lateral acceleration calculation unit 122, a maximum anti-overturn velocity calculation unit 123, a steering wheel control unit 124, a brake control unit 125, a throttle control unit 126, a control unit 127 and an indication unit 128.

As shown in FIG. 1, the second storage unit 121 is configured to store the centroid distance $h_{cr}$, the sprung mass $m_S$, a rotation center distance $h_{fr}$ and a wheelbase $l_{wb}$. As shown in FIG. 4, the rotation center distance $h_{fr}$ is, for example, the distance between the rotation center C2 and a bottom surface (which contacts the ground) of the wheel 12 in the axis z, while the wheelbase $l_{wb}$ is, for example, the distance between the two wheels 12 of the vehicle 10. The maximum anti-overturn lateral acceleration calculation unit 122 is configured to obtain the maximum anti-overturning lateral acceleration $a_{y,max}$ according to the load position $P_W$ $(l_W, h_W)$, the load $m_W$, the centroid distance $h_{cr}$, the sprung mass $m_S$, the rotation center distance $h_{fr}$, and the wheelbase $l_{wb}$.

In an embodiment, the maximum anti-overturn lateral acceleration calculation unit 122 could obtain the maximum anti-overturning lateral acceleration $a_{y,max}$ according to the following formulas (3) to (3D). The coefficients $A_{V,s}$, $A_{H,s}$, $A_{V,w}$ and $A_{H,w}$ of formula (3) could be obtained according to formulas (3A) to (3D) respectively.

$$m_s A_{H,s} + m_w \cos\phi A_{H,w} + m_w g \sin\phi A_{V,w} - \quad (3)$$
$$m_s a_y A_{V,s} - m_w a_y \cos\phi A_{V,w} + m_w a_y \sin\phi A_{H,w} = 0$$

$$A_{V,s} = h_{cr}\cos\phi + h_{fr} \quad (3A)$$

$$A_{H,s} = \frac{l_{wb}}{2} - h_{cr}\sin\phi \quad (3B)$$

$$A_{V,w} = h_w\cos\phi - l_w\sin\phi + h_{cr}\cos\phi + h_{fr} \quad (3C)$$

$$A_{H,w} = \frac{l_{wb}}{2} - h_{cr}\sin\phi - h_w\sin\phi - l_w\cos\phi \quad (3D)$$

After obtaining the maximum anti-overturning lateral acceleration $a_{y,max}$, the maximum anti-overturn velocity calculation unit 123 is configured to obtain the maximum anti-overturning velocity $V_{max}$ corresponding to the maximum anti-overturning lateral acceleration $a_{y,max}$ according to the maximum anti-overturning lateral acceleration $a_{y,max}$ and a turning curvature radius r of the vehicle. For example, the maximum anti-overturn velocity calculation unit 123 could obtain the maximum anti-overturn velocity $V_{max}$ according to the following formula (4). In formula (4), r is the turning curvature radius of the vehicle 10, and its value could depend on a road condition where the vehicle 10 is located, or the turning curvature radius r of the vehicle 10 itself. As long as the turning velocity of the vehicle 10 under the turning curvature radius r does not exceed the maximum anti-overturning velocity $V_{max}$, the vehicle 10 will not lose control (that is, controllable). For example, rollover will not occur. In addition, the maximum anti-overturn velocity calculation unit 123 could obtain the turning curvature radius r from a map data stored in the storage unit.

$$V_{max} = \sqrt{a_{y,max} \times r} \quad (4)$$

After obtaining the maximum anti-overturning velocity $V_{max}$, the control unit 127 could control a steering wheel, a brake and/or a throttle of the vehicle 10 so that the velocity of the vehicle 10 does not exceed the maximum anti-overturning velocity $V_{max}$, so as to avoid loss of control of the vehicle. Further examples are described below.

For example, the control unit 127 is electrically connected to the steering wheel control unit 124, the brake control unit 125 and the throttle control unit 126, and could control the steering wheel, the brake and/or the throttle of the vehicle 10 through these units.

The steering wheel control unit 124 is electrically connected to a driving mechanism of the steering wheel of the vehicle 10. The steering wheel control unit 124 could control the driving mechanism to drive a rotation direction and/or a rotation amount of the steering wheel. The control unit 127 could control the steering wheel control unit 124 to control the turning direction and/or the turning amount of the steering wheel of the vehicle 10, thereby controlling the turning curvature radius of the vehicle 10, so as to prevent the velocity of the vehicle 10 from exceeding the maximum anti-overturning velocity $V_{max}$. For example, when the velocity of the vehicle 10 is close to (or approximates to) the maximum anti-overturning velocity $V_{max}$, the steering wheel control unit 124 could control the steering wheel of the vehicle 10 to reduce a turning angle, so as to reduce the turning curvature radius r and change a driving path and/or a driving trajectory.

The brake control unit 125 is electrically connected to the brake system (not shown) of the vehicle 10. The control unit 127 could control the brake control unit 125 to drive the brake system to adjust the brake force of the brake system for controlling the velocity of the vehicle 10. For example, the brake control unit 125 controls the brake force of the vehicle 10 according to the load $m_W$. The greater the load $m_W$ is, the greater the brake force of the vehicle 10 is. When the brake force applied by driver is insufficient, the brake control unit 125 could assist in increasing the brake force of the vehicle 10. In an embodiment, the brake control unit 125 could increase or decrease the brake force according to a navigation planning route. The aforementioned navigation planning route could be obtained by a navigation device (not shown).

The throttle control unit 126 is electrically connected to a throttle system (not shown) of the vehicle 10. The control unit 127 could control the throttle control unit 126 to drive the throttle opening degree (not shown) of the vehicle 10 to control an output horsepower of the power system of the vehicle 10 for adjusting the velocity of the vehicle 10.

The indication unit 128 is electrically connected to the maximum anti-overturn velocity calculation unit 123. The indication unit 128 is configured to: when the velocity of the vehicle 10 is close to the maximum anti-overturning velocity $V_{max}$, generate an indication signal S1 to warn the driver that the vehicle 10 may or will be out of control. In addition, the indication unit 128 is further configured to: when the acceleration of the vehicle 10 is close to the maximum anti-overturning lateral acceleration $a_{y,max}$, generate the indication signal S1 to warn the driver that the vehicle 10 may or will be out of control.

Figure 5:
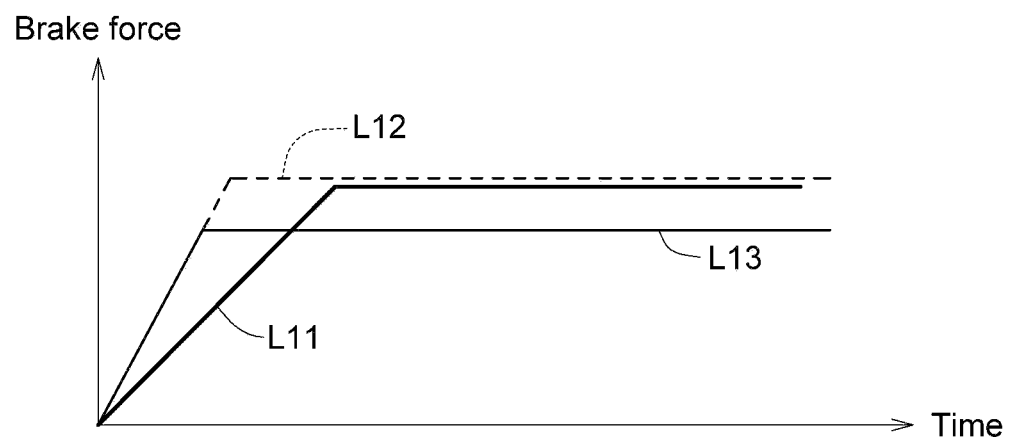
FIG. 5 shows a schematic diagram of a relationship between time and brake force which is achieved by the vehicle anti-runaway system of FIG. 1.
Figure 6:
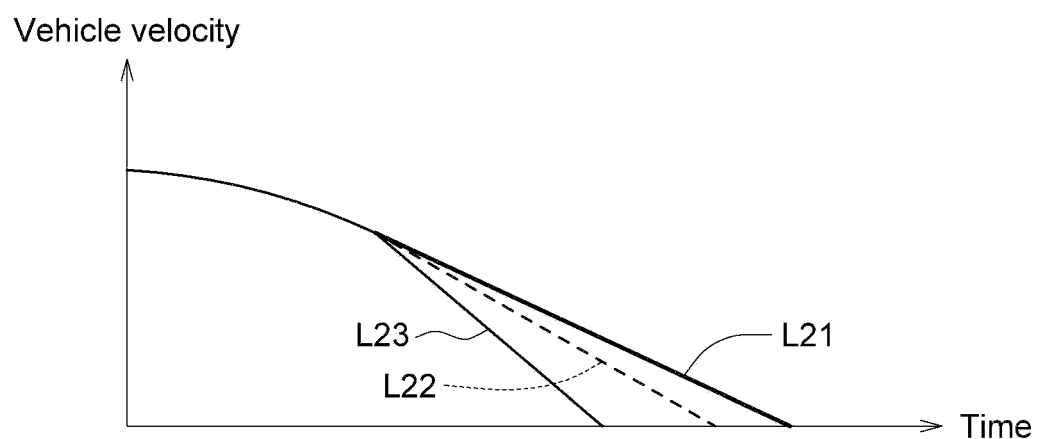
FIG. 6 shows a schematic diagram of a relationship between time and velocity which is achieved by the vehicle anti-runaway system of FIG. 1.

Referring to FIGS. 5 to 6, FIG. 5 shows a schematic diagram of a relationship between time and brake force which is achieved by the vehicle anti-runaway system 100 of FIG. 1, and FIG. 6 shows a schematic diagram of a relationship between time and velocity which is achieved by the vehicle anti-runaway system 100 of FIG. 1.

As shown in FIG. 5, a curve L11 represents a variation of the brake force of a conventional vehicle in the loaded state, a curve L12 represents a variation of the brake force of the vehicle 10 in the loaded state, and a curve L13 represents a variation of the brake force of the vehicle 10 in the empty state (no cargo). In general, when driving, the driver does not consider the impact of the load on the brake force. Therefore, when the load is high, it is difficult for the brake force curve to reach a target value (reason is that the driver does not have enough time to react). However, since the embodiment of the present disclosure could obtain the load $m_W$ in advance, the brake force could be adjusted under consideration of the load $m_W$, and the brake force control of the high-load vehicle could be corrected in advance. Comparing the curves L11 and L12, under the same brake force, the vehicle 10 of the present disclosed embodiment takes less time. Comparing the curves L12 and L13, since the vehicle 10 in the embodiment of the present disclosure could obtain the load $m_W$ in advance, the brake force could be increased in advance.

As shown in FIG. 6, a curve L21 represents a variation of the velocity of the conventional vehicle in the loaded state, a curve L22 represents a variation of the velocity of the vehicle 10 in the loaded state, and a curve L23 represents a variation of the velocity of the vehicle 10 in the empty state (no cargo). Comparing the curves L21, L22 and L23, since the vehicle 10 of the embodiment of the present disclosure could obtain the load $m_W$ in advance, the time required for the vehicle 10 of the embodiment of the present disclosure is less under the same velocity drop.

As shown in FIGS. 5 and 6, compared with the conventional vehicle, the vehicle 10 of the disclosed embodiment could achieve the same deceleration and brake force in a shorter time.

Figure 7A:
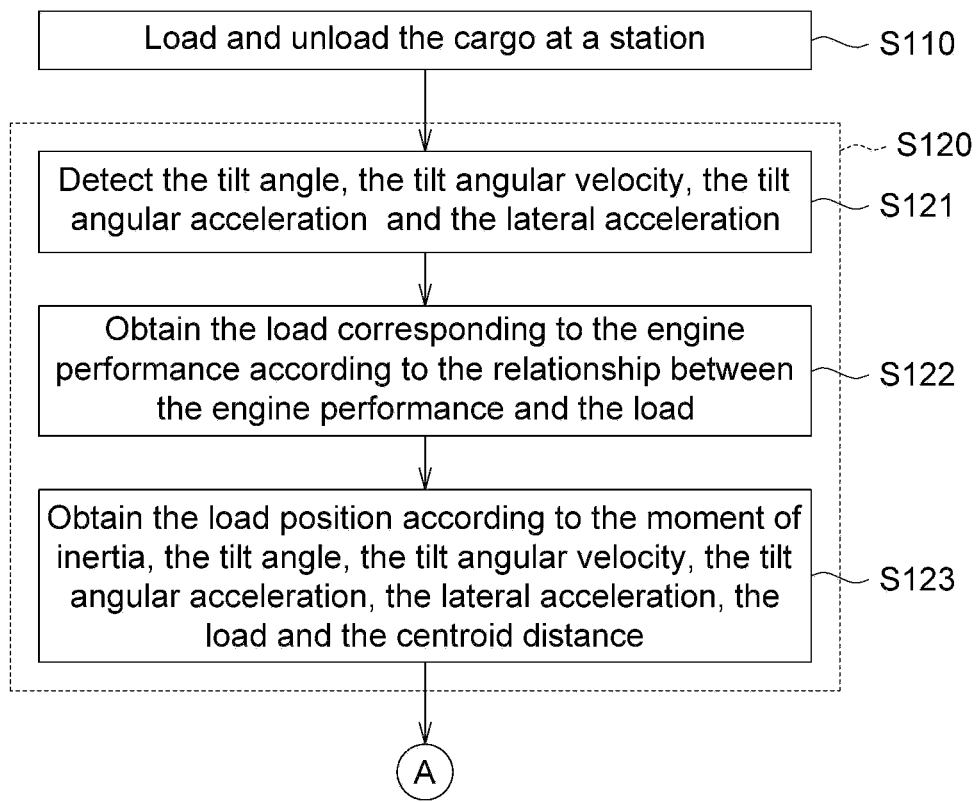
FIGS. 7A and 7B show a flowchart of a vehicle anti-runaway method for the vehicle according to an embodiment of the present disclosure.
Figure 7B:
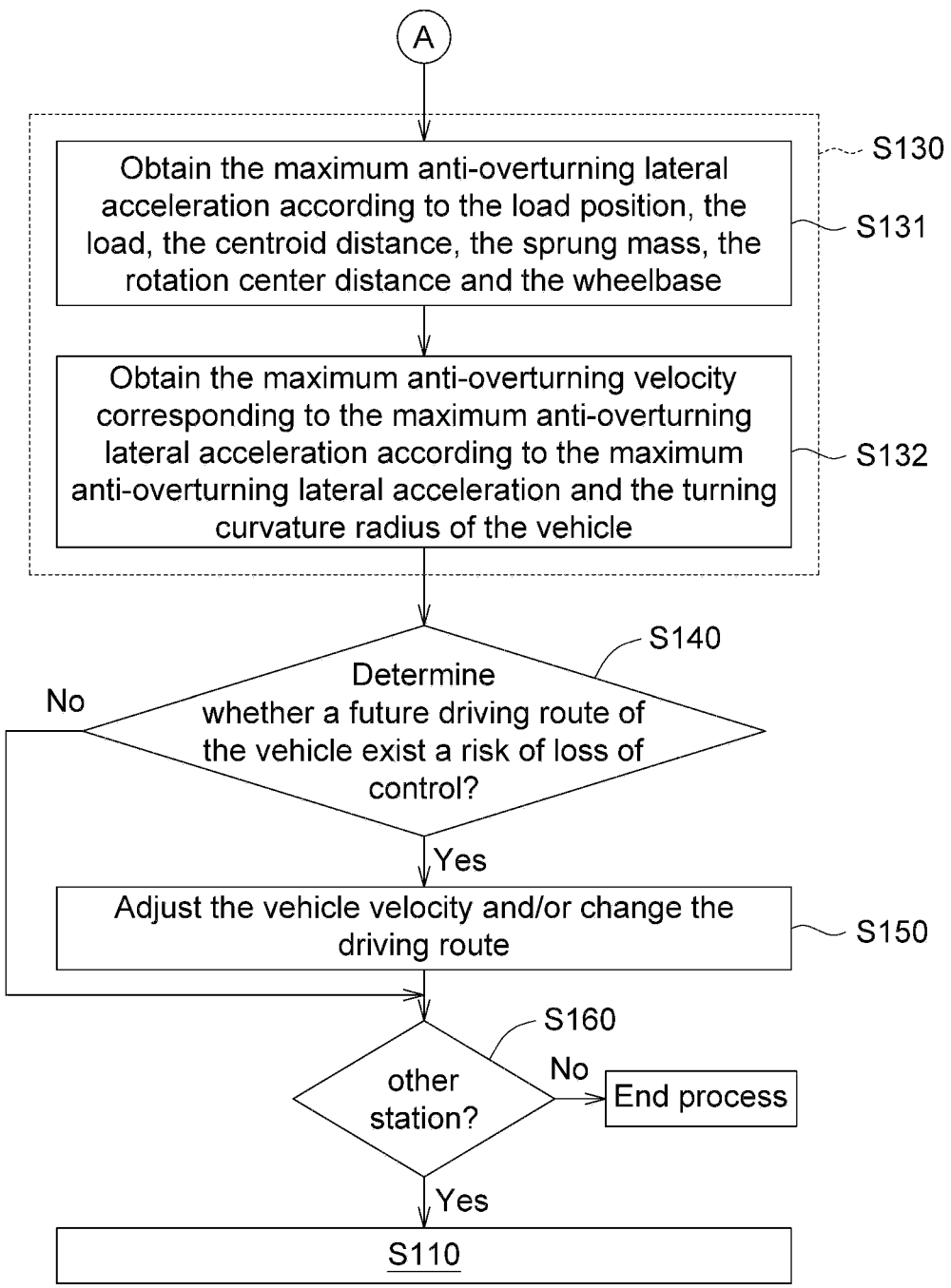

Referring to FIGS. 7A and 7B, FIGS. 7A and 7B show a flowchart of a vehicle anti-runaway method for the vehicle 10 according to an embodiment of the present disclosure.

In step S110, the vehicle 10 loads and unloads the cargo at a station.

In step S120, the load $m_W$ and the load position $P_W$ are obtained by using the aforementioned load calculation method. Step S120 could include the following steps S121 to S123.

In step S121, the inertial sensing unit 112 detects the tilt angle $\emptyset$, the tilt angular velocity $\dot{\emptyset}$, the tilt angular acceleration $\ddot{\emptyset}$ and the lateral acceleration $a_y$.

In step S122, the calculation unit 113 obtains the load $m_W$ corresponding to the engine performance according to the relationship R1 between the engine performance and the load.

In step S123, the calculation unit 113 obtains the load position $P_W$ according to the moment of inertia $I_{XX}$, the tilt angle $\emptyset$, the tilt angular velocity $\dot{\emptyset}$, the tilt angular acceleration $\ddot{\emptyset}$, the lateral acceleration $a_y$, the load $m_W$ and the centroid distance $h_{cr}$.

In step S130, after obtaining the load $m_W$ and the load position $P_W$, the maximum anti-overturning velocity $V_{max}$ is obtained according to at least the load $m_W$ and the load position $P_W$. Step S130 could include the following steps S131 to S132.

In step S131, the maximum anti-overturn lateral acceleration calculation unit 122 obtains the maximum anti-overturning lateral acceleration $a_{y,max}$ according to the load position $P_W$ ($l_W$, $h_W$), the load $m_W$, the centroid distance $h_{cr}$, the sprung mass $m_S$, the rotation center distance $h_{fr}$, and the wheelbase $l_{wb}$.

In step S132, the maximum anti-overturn velocity calculation unit 123 obtains the maximum anti-overturning velocity $V_{max}$ corresponding to the maximum anti-overturning lateral acceleration $a_{y,max}$ according to the maximum anti-overturning lateral acceleration $a_{y,max}$ and a turning curvature radius r of the vehicle 10.

In step S140, the control unit 127 determines whether a future driving route and/or a driving trajectory of the vehicle 10 exists a risk of loss of control. If so, the process proceeds to step S150; if not, the process proceeds to step S160.

In step S150, the control unit 127 could adjust the vehicle velocity, change the driving route and/or the driving trajectory, and control the steering wheel, the brake and/or the throttle of the vehicle 10 so that the vehicle velocity does not exceed the maximum anti-overturning velocity $V_{max}$ for avoiding loss of control of the vehicle. The control unit 127 adjusts the velocity of the vehicle and changes the driving route and/or the driving trajectory as described above, and the similarities will not be repeated here. During the course between the two stations, the vehicle anti-runaway system 100 executes steps S110 to S150 at each time point, and obtains the load position $P_W$, the maximum anti-overturning lateral acceleration $a_{y,max}$ and the maximum anti-overturning velocity $V_{max}$ by using the tilt angle $\emptyset$, the tilt angular velocity $\dot{\emptyset}$, the tilt angular acceleration $\ddot{\emptyset}$, the lateral acceleration $a_y$ and engine performance.

In step S160, if the vehicle 10 still needs to load and unload the cargo at other station, the process returns to step S110 and repeats the same steps above; if not, the process ends.

The other steps of the vehicle anti-runaway method in the embodiment of the present disclosure have been described above, and they will not be repeated here.

To sum up, the embodiment of this disclosure proposes a loading calculation module, a vehicle anti-runaway system, a vehicle using the same, a load calculation method using the same and a vehicle anti-runaway method using the same. The load calculation module is configured to calculate or obtain a height and a weight of the current cargo during the driving state, and accordingly adjusts a brake control and a brake distance estimation. The runaway prevention module is configured to calculate or obtain the maximum anti-overturning lateral acceleration and the maximum anti-overturning velocity which could be withstand in the future driving path and/or driving trajectory for adjusting the vehicle velocity and/or correcting the path, thereby ensuring that the vehicle could maintain a safe distance during driving, and applying the brakes smoothly to avoid overturning.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. A vehicle anti-runaway system, comprising:
a load calculation module, comprising:
a first storage unit configured to store a relationship between an engine performance and a load, a sprung mass, a centroid distance between a sprung centroid and a rotation center;
an inertial sensing unit configured to detect a tilt angle, a tilt angular velocity, a tilt angular acceleration and a lateral acceleration; and
a calculation unit configured to:
obtain the load corresponding to the engine performance according to the relationship between the engine performance and the load; and
obtain a load position according to a moment of inertia, the tilt angle, the tilt angular velocity, the tilt angular acceleration, the lateral acceleration, the load and the centroid distance; and
a runaway prevention module, comprising:
a second storage unit configured to store the centroid distance, the sprung mass, a rotation center distance and a wheelbase;
a maximum anti-overturn lateral acceleration calculation unit configured to obtain a maximum anti-overturning lateral acceleration according to the load position, the load, the centroid distance, the sprung mass, the rotation center distance and the wheelbase; and
a steering wheel control unit;
a brake control unit;
a throttle control unit; and
a control unit electrically connected to the steering wheel control unit, the brake control unit and the throttle control unit;
wherein the first storage unit, the inertial sensing unit and the calculation unit are physical circuits, the inertial sensing unit is a gyroscope, an acceleration sensor or a combination thereof, and the load and the load position is configured to obtain a maximum anti-overturning velocity;
wherein after obtaining the maximum anti-overturning velocity, the control unit controls the steering wheel of a vehicle through the steering wheel control unit, a brake of the vehicle through the brake control unit and/or a throttle of the vehicle through the throttle control unit so that the vehicle velocity of the vehicle does not exceed the maximum anti-overturning velocity.

2. The vehicle anti-runaway system as claimed in claim 1, wherein the runaway prevention module further comprises:
a maximum anti-overturn velocity calculation unit configured to obtain the maximum anti-overturning velocity corresponding to the maximum anti-overturning lateral acceleration according to the maximum anti-overturning lateral acceleration and a turning curvature radius of the vehicle.

3. The vehicle anti-runaway system as claimed in claim 2, wherein the vehicle anti-runaway system further comprises:
an indication unit electrically connected to the maximum anti-overturn velocity calculation unit and configure to:
generate an indication signal when the vehicle velocity is close to the maximum anti-overturning velocity.

4. The vehicle anti-runaway system as claimed in claim 2, wherein the steering wheel control unit is electrically connected to the maximum anti-overturn velocity calculation unit and configured to:
reduce a rotation angle of the steering wheel when the vehicle velocity is close to the maximum anti-overturning velocity.

5. The vehicle runaway prevention system as claimed in claim 2, wherein the brake control unit is electrically connected to the maximum anti-overturn velocity calculation unit and configured to:
control a brake force according to the load.

6. The vehicle anti-runaway system as claimed in claim 5, wherein the brake control unit is further configured to:
add the brake force according to a navigation planning route.

7. A vehicle comprising:
an unsprung system having a rotation center;
a sprung system disposed on the unsprung system and having a sprung centroid; and
a vehicle anti-runaway system comprising:
a load calculation module, comprising:
a first storage unit configured to store a relationship between an engine performance and a load, a sprung mass, a centroid distance between a sprung centroid and a rotation center;
an inertial sensing unit configured to detect a tilt angle, a tilt angular velocity, a tilt angular acceleration and a lateral acceleration; and
a calculation unit configured to:
obtain the load corresponding to the engine performance according to the relationship between the engine performance and the load; and
obtain a load position according to a moment of inertia, the tilt angle, the tilt angular velocity, the tilt angular acceleration, the lateral acceleration, the load and the centroid distance; and
a runaway prevention module, comprising:
a second storage unit configured to store the centroid distance, the sprung mass, a rotation center distance and a wheelbase;
a maximum anti-overturn lateral acceleration calculation unit configured to obtain a maximum anti-overturning lateral acceleration according to the load position, the load, the centroid distance, the sprung mass, the rotation center distance and the wheelbase; and
a steering wheel control unit;
a brake control unit;
a throttle control unit; and
a control unit electrically connected to the steering wheel control unit, the brake control unit and the throttle control unit;
wherein the first storage unit, the inertial sensing unit and the calculation unit are physical circuits, the inertial sensing unit is a gyroscope, an acceleration sensor or a combination thereof, and the load and the load position is configured to obtain a maximum anti-overturning velocity;
wherein after obtaining the maximum anti-overturning velocity, the control unit controls the steering wheel of a vehicle through the steering wheel control unit, a brake of the vehicle through the brake control unit and/or a throttle of the vehicle through the throttle control unit so that the vehicle velocity of the vehicle does not exceed the maximum anti-overturning velocity.

8. A vehicle anti-runaway method, comprising:
detecting a tilt angle, a tilt angular velocity, a tilt angular acceleration and a lateral acceleration by an inertial sensing unit;
obtaining a load corresponding to an engine performance according to a relationship between the engine performance and the load by a calculation unit; and
obtaining a load position according to a moment of inertia, the tilt angle, the tilt angular velocity, the tilt angular acceleration, the lateral acceleration, the load and a centroid distance by the calculation unit;
and
obtaining a maximum anti-overturning lateral acceleration according to the load position, the load, the centroid distance, the sprung mass, a rotation center distance and a wheelbase;
wherein the inertial sensing unit and the calculation unit are physical circuits, the inertial sensing unit is a gyroscope, an acceleration sensor or a combination thereof;
wherein after obtaining the maximum anti-overturning velocity, the control unit controls a steering wheel of a vehicle through a steering wheel control unit, a brake of the vehicle through a brake control unit and/or a throttle of the vehicle through a throttle control unit so that the vehicle velocity of the vehicle does not exceed the maximum anti-overturning velocity.

9. The vehicle anti-runaway method as claimed in claim 8, further comprising:
obtaining the maximum anti-overturning velocity corresponding to the maximum anti-overturning lateral acceleration according to the maximum anti-overturning lateral acceleration and a turning curvature radius of the vehicle by a maximum anti-overturn velocity calculation unit.

10. The vehicle anti-runaway method as claimed in claim 9, further comprising:
generating an indication signal when the vehicle velocity is close to the maximum anti-overturning velocity.

11. The vehicle anti-runaway method as claimed in claim 9, further comprising:
when the vehicle velocity is close to the maximum anti-overturning velocity, reducing a steering wheel rotation angle by the steering wheel control unit.

12. The vehicle anti-runaway method as claimed in claim 9, further comprising:
controlling a brake force according to the load by the brake control unit.

13. The vehicle anti-runaway method as claimed in claim 12, further comprising:
adding the brake force according to a navigation planning route by the brake control unit.

* * * * *